United States Patent [19]

Kohler et al.

[11] 4,214,344
[45] Jul. 29, 1980

[54] WINDSHIELD WIPER

[75] Inventors: Alfred Kohler; Hans Prohaska, both of Bietigheim-Bissingen, Fed. Rep. of Germany

[73] Assignee: ITT Industries, Inc., New York, N.Y.

[21] Appl. No.: 22,198

[22] Filed: Mar. 20, 1979

[30] Foreign Application Priority Data

Mar. 22, 1978 [DE] Fed. Rep. of Germany ....... 2812412

[51] Int. Cl.² ............................................. B60S 1/40
[52] U.S. Cl. ............................ 15/250.32; 15/250.35
[58] Field of Search ............ 15/250.31, 250.32, 250.35

[56] References Cited

U.S. PATENT DOCUMENTS

| 1,432,819 | 10/1922 | Wolfe | 15/250.31 |
| 1,834,615 | 1/1931 | Hancock | 15/250.31 X |
| 3,670,355 | 6/1972 | Sakamoto | 15/250.32 |
| 3,893,204 | 7/1975 | Kolb | 15/250.32 X |

FOREIGN PATENT DOCUMENTS

| 105750 | 11/1938 | Australia | 15/250.32 |
| 2105775 | 10/1971 | Fed. Rep. of Germany | 15/250.35 |

*Primary Examiner*—Christopher K. Moore
*Attorney, Agent, or Firm*—James B. Raden; Donald J. Lenkszus

[57] ABSTRACT

A windshield wiper assembly is described wherein a separate pivot pin between the wiper arm and the supporting yoke is eliminated. The arm includes a generally "U"-shaped wire end which is lockable into a recess on the back of the main yoke. The end of the "U" serves as a pivot pin.

4 Claims, 2 Drawing Figures

WINDSHIELD WIPER

BACKGROUND OF THE INVENTION:

1. Field of the Invention

The invention relates to windshield wiper assemblies.

2. Description of the Prior Art

Windshield wiper assemblies are known comprising a wiper arm and a main yoke. The main yoke includes a recess adapted to receive the wiper arm. The wiper arm is connected to the main yoke by means of a connecting element and is pivotally locked with a pin secured between the side walls of the main yoke. In these assemblies, the wiper arm extends above the supporting yoke system resulting in a relatively large overall assembly height.

In other known windshield wiper assemblies, the wiper arm is positioned laterally of the supporting yoke system and is suspended on a pivot pin laterally projecting on the wiper blade yoke system. These assemblies are preferred for styling reasons, and because a low overall height is obtained which results in the assembly having a lesser likelihood of lifting from the windshield when the vehicle is moving at higher speed.

German laid open print U.S. Pat. No. 2,105,775 shows a wiper arm with a U-shaped wire yoke. The free ends of the yoke each include a coupling member for attaching the wiper blade. The web of the yoke is fixed on a link. The wiper arm in this assembly is positioned above the supporting yoke system of the wiper blade.

In all these prior assemblies, the wiper blade has to be provided with a pivot pin on which the coupling member to the wiper arm is coupled.

For wiping efficiency, it is advantageous to maintain the wiper blade perpendicular to the windshield so that the edge of the wiper lip wipes over the windshield at an angle of about 45°. In prior assemblies having the wiper arm centrally attached between the side walls of the main yoke, it is difficult to obtain these relationships. The combination of the driving force on the wiper arm and the frictional force between the wiper lip and the windshield creates a pitching moment on the connection between the wiper arm and the main yoke such that the wiper blade tilts.

SUMMARY OF THE INVENTION

In accordance with the principles of the invention, a windshield wiper assembly includes a wire yoke arm having two parallel legs and a web connecting the legs. The supporting yoke includes a recess adapted to receive the web. The web is pivotally locked into the recess. The web thereby functions as a pivot pin. The two legs of the main yoke are positioned lateral to the wiper blade.

Further in accordance with the invention, the legs of the wire yoke arm are bent downwards from the web towards the wiper element and extend lateral to the supporting yoke to thereby oppose any pitching moment on the wiper assembly.

BRIEF DESCRIPTION OF THE DRAWINGS:

The invention may be better understood from a reading of the following detailed description taken in conjunction with the drawings in which.

Figure 1:
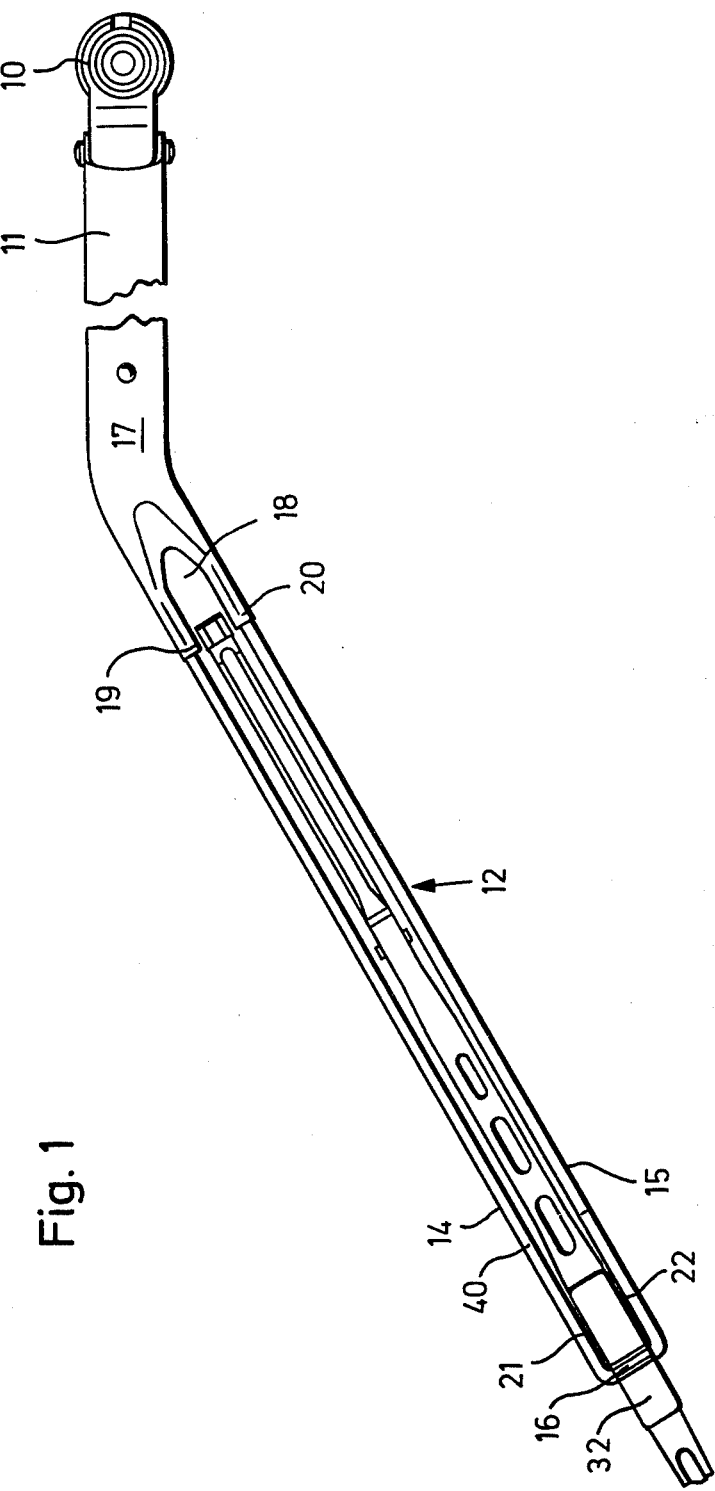
FIG. 1 is a top view of a wiper assembly in accordance with the principles of the invention.

DETAILED DESCRIPTION OF THE DRAWINGS:

The wiper arm consists of a known fastening member 10, a link 11 suspended thereon in a jointed manner, a wire yoke 12 and a pull spring 13. In the top view according to FIG. 1, the wire yoke is approximately U-shaped with two legs 14 and 15 and a web 16 connecting said legs. The free ends of the legs 14 and 15 are secured to the link 11. For this purpose, the back 17 of the link 11 is provided with a recess 18 so that two lateral studs 19 and 20 are formed which are rolled around the free ends of the legs 14 and 15.

The wiper blade 30 has a supporting yoke system 31 on which a wiper rubber element 42 is suspended in known manner. A plastic slider 32 is secured centrally on the main yoke and has an open-edged recess 33, the axis of which extends perpendicular to the longitudinal direction of the wiper blade. The recess 33 is adapted to receive the web 16 of the wire yoke. Thus, the web 16 directly serves as pivot pin.

Figure 2:
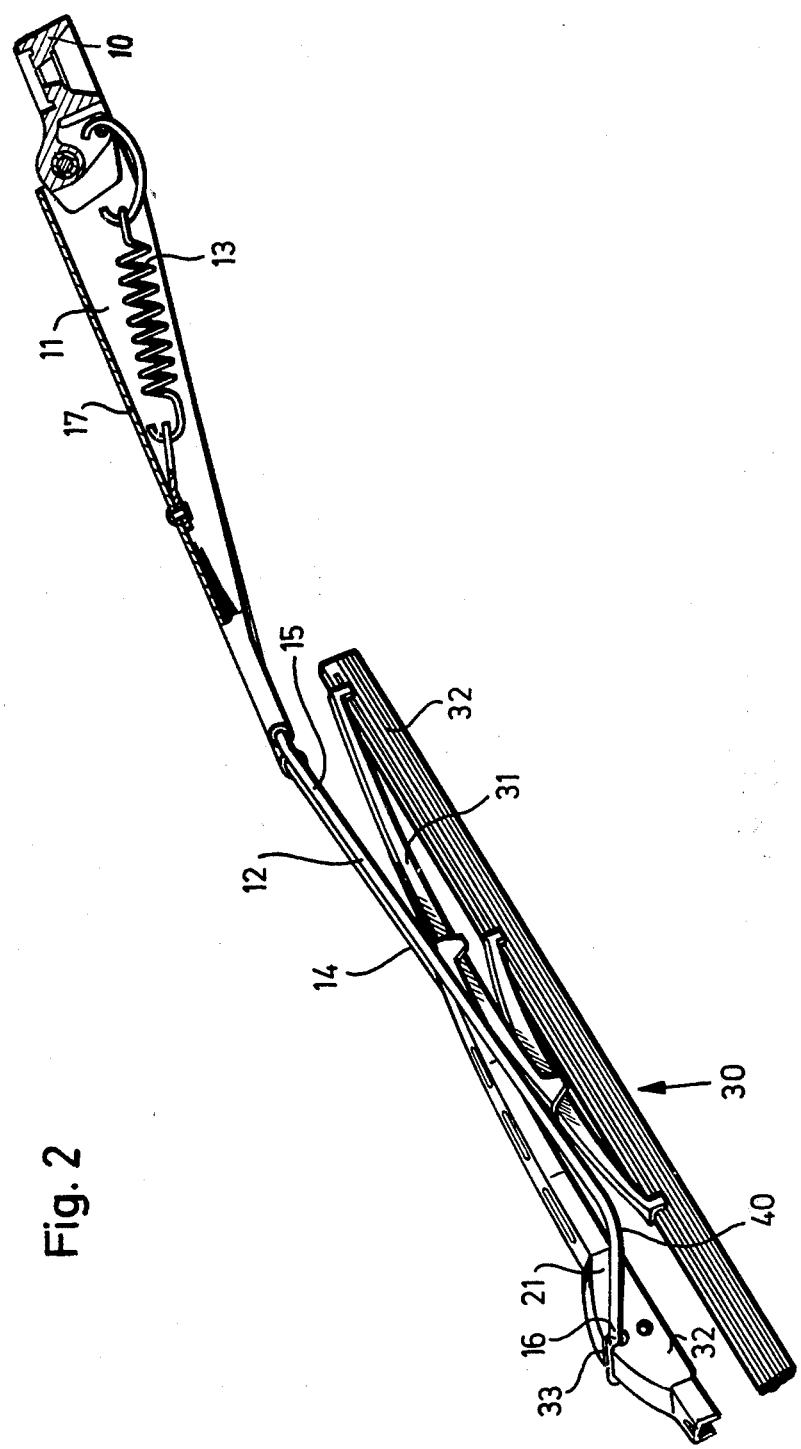
FIG. 2 is a perspective view of the wiper assembly.

Beginning at the web 16, the two legs of the wire yoke, at first, are extending on opposite sides of the main yoke towards the wiper rubber element as FIG. 2 shows. Thereby, the lateral surfaces 21 and 22 of the slider 32 serve as guide surfaces. The two legs of the wire yoke have a bending at 40 in a way that they extend laterally to the yoke system and do not project over the maximum overall height of the wiper blade which, thus, is defined by the design of the supporting yoke system only.

From FIG. 1 can be seen that the length of the wire yoke legs is greater than half of the wiper blade length so that the wiper blade can freely be swivelled to an fro between said legs 14 and 15 when the wiper is moved over a curved windshield. In the embodiment shown, the legs extend in parallel to each other. This is not necessary but is advantageous because for styling reasons.

Thus, a wiper with only a few piece parts is achieved which can be easily assembled has a small overall height and sufficient stability and, due to favorable flow conditions, can also be used for higher driving speeds.

In the operating position, the two legs of the wire yoke extend at least approximately in parallel to the windshield to be cleaned. In FIG. 2, the wiper blade is shown swivelled out of the operating position to more clearly show the features of the structure.

What is claimed is:

1. A windshield wiper assembly comprising:
   a supporting yoke having a recess;
   a wiper blade coupled to said supporting yoke and including a wiping element;
   a wiper arm comprising a wire yoke including two parallel legs; and
   a web connecting said legs, said recess being adapted to pivotally retain said web.

2. A windshield wiper assembly in accordance with claim 1, wherein each of said two parallel legs includes a first portion extending from said web toward said wiping element and a second portion extending laterally along said supporting yoke.

3. A windshield wiper assembly in accordance with claim 1 or 2, wherein said supporting yoke includes a pair of surfaces for respectively guiding said two parallel legs.

4. A windshield wiper assembly in accordance with claim 1 or 2, wherein each of said two parallel legs has a length greater than one half of the length of said wiper blade.

* * * * *